United States Patent
Price et al.

(10) Patent No.: US 7,050,255 B2
(45) Date of Patent: May 23, 2006

(54) SYSTEM AND APPARATUS FOR ASSEMBLY LEVEL DISK ERASE

(75) Inventors: Kirk Price, San Jose, CA (US); Neal Bertram Schirle, Morgan Hill, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 14 days.

(21) Appl. No.: 10/673,600

(22) Filed: Sep. 29, 2003

(65) Prior Publication Data

US 2005/0068654 A1 Mar. 31, 2005

(51) Int. Cl.
*G11B 5/03* (2006.01)

(52) U.S. Cl. .................. 360/66; 360/57; 360/55; 361/143; 361/149

(58) Field of Classification Search .............. 360/66, 360/57, 97.02, 55, 60, 256.2, 264.9, 97.01; 369/13.04; 361/143, 149, 257; 335/209, 335/284; 386/63
See application file for complete search history.

(56) References Cited

U.S. PATENT DOCUMENTS

| | | | | |
|---|---|---|---|---|
| 4,553,183 A * | 11/1985 | Brown et al. | ............. | 360/97.02 |
| 6,351,344 B1 * | 2/2002 | Krum et al. | ............. | 360/97.01 |
| 6,522,498 B1 * | 2/2003 | Lim et al. | ................ | 360/97.02 |
| 6,570,727 B1 * | 5/2003 | Tamura et al. | ................ | 360/66 |
| 6,594,099 B1 * | 7/2003 | Serizawa | ................ | 360/66 |

* cited by examiner

*Primary Examiner*—David Hudspeth
*Assistant Examiner*—Natalia Figueroa
(74) *Attorney, Agent, or Firm*—Bracewell & Giuliani LLP

(57) ABSTRACT

A disk erase apparatus for erasing information on one or more disks in a disk drive uses a high strength magnetic field to erase the disks while the disks are in the HDD assembly. The design of the head disk enclosure provides a reduced thickness in a localized region over the disks. This allows a narrower working magnetic gap of the HDD level disk erase apparatus. The localized region of the HDD may be a formed indentation on the top cover, elimination of flange, and reduced floor thickness of the HDD base.

19 Claims, 3 Drawing Sheets

SYSTEM AND APPARATUS FOR ASSEMBLY LEVEL DISK ERASE

BACKGROUND OF THE INVENTION

1. Technical Field

The present invention relates in general to an improved hard disk drive design and, in particular, to an improved hard disk drive enclosure design and apparatus for erasing or preconditioning the magnetic media of the disk or disks in a hard disk drive at the assembly level.

2. Description of the Related Art

Generally, a data access and storage system consists of one or more storage devices that store data on magnetic storage media. For example, a magnetic storage device is known as a direct access storage device (DASD) or a hard disk drive (HDD) and includes one or more disks, read/write head(s) with actuator and associated controller and electronics to manage local operations concerning the actuator, disks and data stored on the disks. The hard disk(s) themselves are usually made of a substrate of aluminum alloy or a mixture of glass and ceramic, and are covered with a magnetic film coating. The magnetic coating can be several layers of different metal alloys. Typically, the one or more disks are coaxially positioned on a common spindle that is turned by a disk drive motor at several thousand revolutions per minute (rpm).

The disk(s), motorized spindle, read/write heads and actuator are all enclosed using a base and top cover. This assembly level is typically called a head disk enclosure (HDE). The HDE is sealed to maintain an exceptionally clean environment for the read/write heads and recording media. The read/write head, connected to a suspension and arm assembly, is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the read/write head or disk media.

A motor, typically a brushless DC motor, is used to rotate the disk. The disk is mounted and clamped to a hub of the motor. The hub provides a disk mounting surface and a means to attach an additional part or parts to clamp the disk to the hub. In most typical motor configurations of HDDs (hard disk drives), the rotating part of the motor (the rotor) is attached to or is an integral part of the hub. The rotor consists of a ring-shaped magnet with alternating magnetic north/south poles arranged radially and a ferrous metal backing. The magnet interacts with the motor's stator by means of magnetic forces. Magnetic fields and resulting magnetic forces are induced via the electric current in the coiled wire of the motor stator. The ferrous metal backing of the rotor acts as a magnetic return path. For smooth and proper operation of the motor, the rotor magnet magnetic pole pattern should not be substantially altered after it is magnetically charged during the motor's manufacturing process.

The disk recording media typically has several layers that make up a compound magnetic structure. The structure typically includes a high moment soft underlayer and a magnetic top layers which may magnetically couple and help achieve improved magnetic stability, low noise and increased coercivity. The disk magnetic media may be a plurality of compositions and layered designs and could be either longitudinal or perpendicular in orientation of magnetic domains. An external magnetic field can be applied to the disk for preconditioning by orienting the media or erasing any servo pattern data. The required direction of the magnetic field is dependent on the magnetic film media design.

A process called "disk erase" is often a necessary part of manufacturing an HDD. Disk erase involves preconditioning the media by orienting the magnetic domains of the disk's magnetic layer in a consistent uniform state. This process can initially be done prior to HDD assembly as part of the disk manufacturing process, or ideally, while the disk is in the HDE. In addition to initial HDD assembly, disk erase is needed for HDDs that have failed the HDD test or servo write process and have to be reworked by repeating the servo write process. In such cases it would be prohibitively expensive to remove the disk and perform a disk level erase. It is most cost effective to "erase" the disk(s) while they are in the HDE. This can be achieved by one of several methods: 1. use the HDD product read/write heads to write a fixed and uniform pattern over the disk thereby erasing any prior servo pattern. 2. Use a special write head or magnet which enters into the HDE through a port or window in the top cover or base casting. Such port or window would be sealed during normal HDD operation. 3. Expose a portion of the HDE which houses the disk to a high intensity magnetic field while spinning the disk(s).

The method that uses the product heard to erase the disk track by track takes significant time because the head must erase each individual track, one at a time, and progressively move from track to track. Also, the process using the product head is typically done at the servo track write (STW) process, which is currently the single most expensive HDD manufacturing assembly and/or test process due primarily to the cost of the equipment and its relatively limited production capacity throughput.

A method that uses a special manufacturing process write head or a bar magnet brought close to the surface of the disk to erase the disk can have some advantages over using the product head. Such a process can be faster but a disadvantage of this process is that it requires a hole or access port in HDE to allow entry of the special process head or magnet. In addition, this process would have to be performed in a clean environment to prevent contaminants from entering the HDE through the magnet access port.

The third method, exposing a portion of the HDE that houses the disk to a high intensity magnetic field via an HDE level disk erase apparatus, is most desirable for several reasons: 1) it does not require opening up the HDE which would require time and expense and exposes the HDE to possible contamination, and 2) it is fastest and can be performed on fairly simple inexpensive equipment. This method does require that the materials of the top cover and base be non-magnetic. Such use of non-magnetic materials for top cover and base is current state of the art, usual practice.

Although HDE level disk erase is most advantageous, there are several limiting problems:
1. Increasing disk coercivity makes it increasingly difficult to erase the disk
2. The innermost area of the disk is difficult to erase without magnetically damaging the motor rotor
3. Eddy current effects when using aluminum disk substrates make it difficult to control spinning the disks.

With successive HDD products of increased areal density the disk media coercivity is increasing. The increased, coercivity of the disk increases the resistance to demagnetization (i.e., changing the state of the magnetic domains), thus requiring an increased demagnetizing force to erase the disk (write to the disk). Increasing the magnetic field strength of an HDD level disk erase machine exacerbates the problem of modifying, i.e., damaging, (via demagnetization) the spindle motor rotor. Thus, a method is needed to: (1) increase the magnetic field strength of an HDD level disk eraser, and (2) increase the magnetic field without increasing the magnetic field near the spindle motor rotor and/or a method of protecting the spindle motor rotor magnet.

With perpendicular recording media the required magnetic field direction of an HDE level disk erase apparatus is different than that typically used for longitudinal recording media. The required direction is dependent on the design of the compound layers of the media and can be perpendicular to the disk. For longitudinal recording the usual required direction is tangential with respect to the disk.

With increasing magnetic data areal density there is a trend towards an increase in the proportion of HDDs having only one disk. For HDDs having only one disk, it is possible to have an enclosure design, which provides a minimum distance between the disk surface and the outer surface of the enclosure. Such a design could allow for the magnets of a disk erase apparatus to be much closer to the disk and allow for an improved disk erase machine.

SUMMARY OF THE INVENTION

One embodiment of a system and apparatus of the present invention comprises a fast, simple, low cost method of erasing one or more disk(s) (hereinafter, "disks") of a disk drive while still at the HDE assembly level. The invention uses a specially shaped head/disk enclosure design along with a high strength magnetic field to erase the disks while the disks are in the HDE assembly. The invention allows an improved HDE level disk erase compared to more expensive or less efficient methods of disk erase. The invention also allows an improved HDE level disk erase compared to prior art by providing special HDE design features to enable a smaller magnetic gap.

The smaller magnetic gap of the disk erase apparatus enables a more efficiently produced magnetic flux density as well as increased magnetic flux density. The smaller magnetic gap also helps to provide a higher gradient of magnetic flux as a function of approach and insertion into the gap (stroke), thereby reducing exposure of magnetic damage of the motor rotor magnet. FIG. 5 shows a simplified HDD disk erase apparatus and its magnetic gap with thickness in direction Z and HDD insertion of stroke direction Y. A plot of the magnetic flux density (in direction X) as a function of gap and stroke is shown in FIG. 6.

The present invention comprises an HDD enclosure design that minimizes the thickness of the HDD in a localized region over the disk(s). This allows the source of the external magnetic field to be substantially closer to the disk recording media and a narrower working magnetic gap of the HDD level disk erase apparatus that provides two important benefits: (1) reduced stray fields and an increased gradient of magnetic flux as a function of stroke (which help prevent motor rotor demagnetization damage), and (2) increased magnetic field for the same amount of magnet material of the disk erase apparatus. (For the case where a perpendicular magnetic field is required (as in some perpendicular recording media designs), this can allow significant improvement by increased flux density since the increase in magnetic flux density is an inverse relationship to magnet gap, so small reductions in magnet gap can have significant improvement (increase) in magnetic flux density. The effect is most pronounced for the case where a magnetic field that is perpendicular (relative to the disk) is required (as can in some perpendicular recording media designs). Furthermore, the magnetic field can be DC (typically produced by permanent magnets) or AC (produced by electromagnets).

The use of this invention, which is optimized for HDD design for HDD level disk erase, allows a lower cost method of disk erase compared to the alternative prior art methods described above. The present invention is based on narrowing the thickness of the HDD in a localized region over the disks so this region can be inserted into a magnetic gap of an HDD level disk apparatus. This HDD design allows the magnetic gap of the HDD level erase apparatus to be narrower, which achieves a higher magnetic flux density for the same amount of permanent magnet. In addition, it reduces the stray fields and increases gradient of magnetic flux density relative to the stroke of the HDD as it is inserted into the gap, which helps to reduce any spindle motor magnet rotor modification.

The localized, narrower area of the HDD can be achieved with a formed indentation on the top cover and elimination or significant reduction in the side wall dimension of the HDD base plate. Additionally, the base plate thickness can be reduced in this localized area to further reduce the total thickness of the HDD. Essentially, the total thickness of the HDD is reduced in a local area that can reach the radial portion of the disk that is used for data storage and/or retrieval. The width of the narrow region can vary. For maximum magnetic field strength of the HDD disk eraser, a minimum thickness dimension is desired. The current disk eraser magnetic working gap is the 3.5" standard form factor of 1-inch, plus clearance between the HDD and the disk erase apparatus. HDD designs constructed in accordance with the present invention allow for a significant reduction in HDD level disk eraser working magnetic gap.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
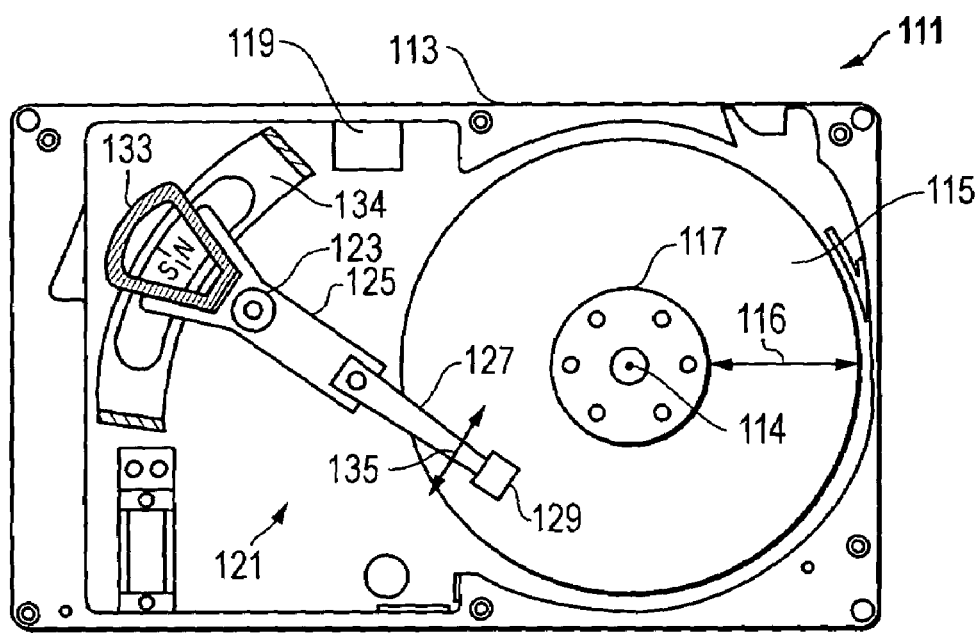
FIG. 1 is a schematic top view of a disk drive constructed in accordance with the present invention and is shown with a top cover thereof removed.

Referring to FIG. 1, a schematic drawing of one embodiment of an information storage system comprising a magnetic hard disk file or drive 111 for a computer system is shown. Drive 111 has an outer housing or enclosure 113 containing at least one magnetic disk 115. Disk 115 has an axis of rotation 114, a storage area 116, and is rotated by a spindle motor assembly having a central drive hub 117. An actuator 121 comprises a plurality of parallel actuator arms 125 (one shown) in the form of a comb that is pivotally mounted to enclosure 113 about a pivot assembly 123. A controller 119 is also mounted to enclosure 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127. The head is typically pico size (approximately 1250×1000×300 microns) and formed from ceramic or intermetallic materials. The head also may be femto size (approximately 850×700×230 microns) and is pre-loaded against the surface of disk 115 (in the range two to ten grams) by suspension 127.

Suspensions 127 have a spring-like quality, which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
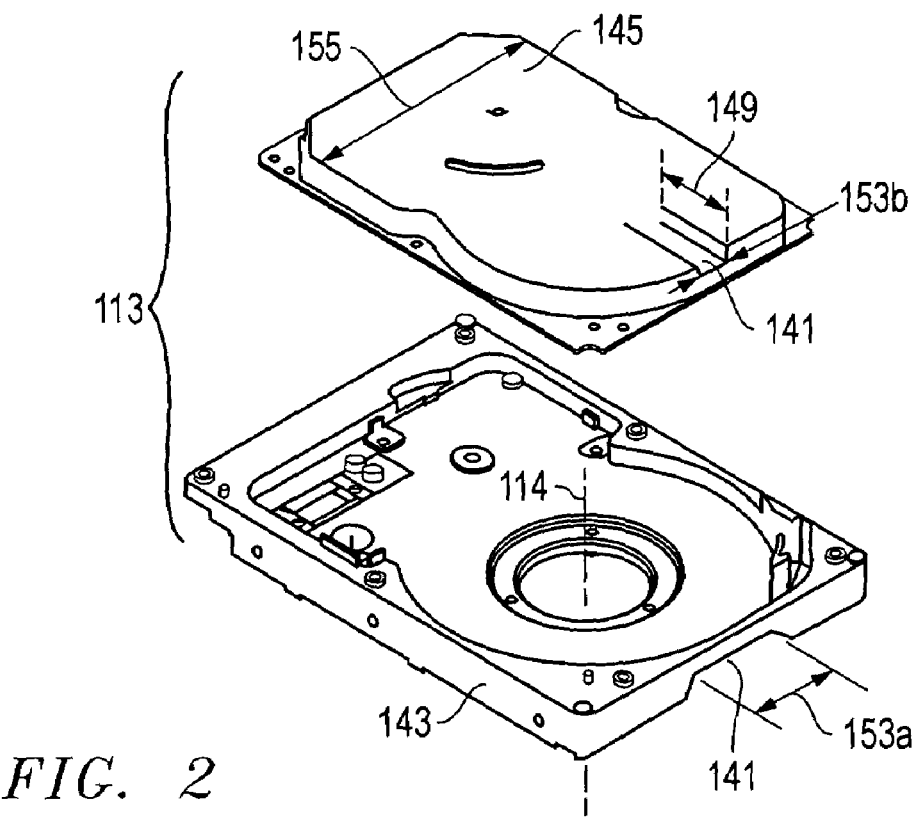
FIG. 2 is an exploded isometric view of one embodiment of an enclosure for the disk drive of FIG. 1.
Figure 3:
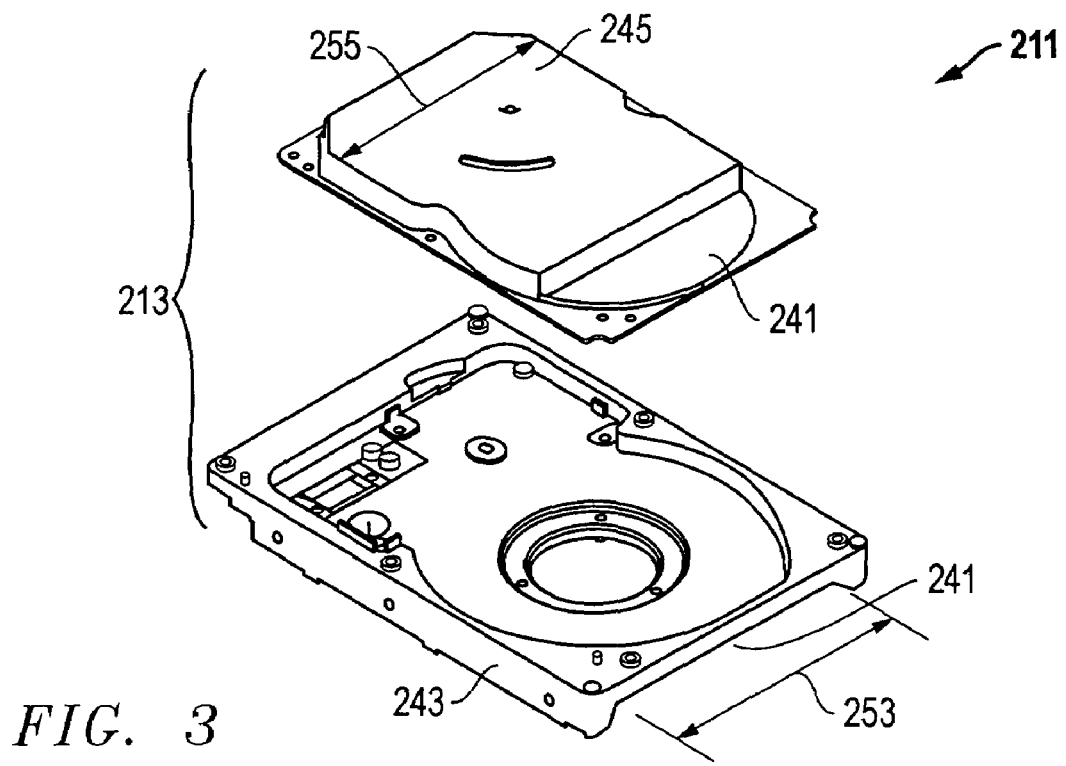
FIG. 3 is an exploded isometric view of another embodiment of an enclosure for the disk drive of FIG. 1.

Referring now to FIGS. 2 and 3, two embodiments of the hard disk drive 111, 211, respectively, constructed in accordance with the invention are shown. For simplicity, the contents of the hard disk drives are not illustrated. As will be discussed in greater detail below, the only difference between the two embodiments is the configuration of their disk regions 141, 241.

Figure 4:
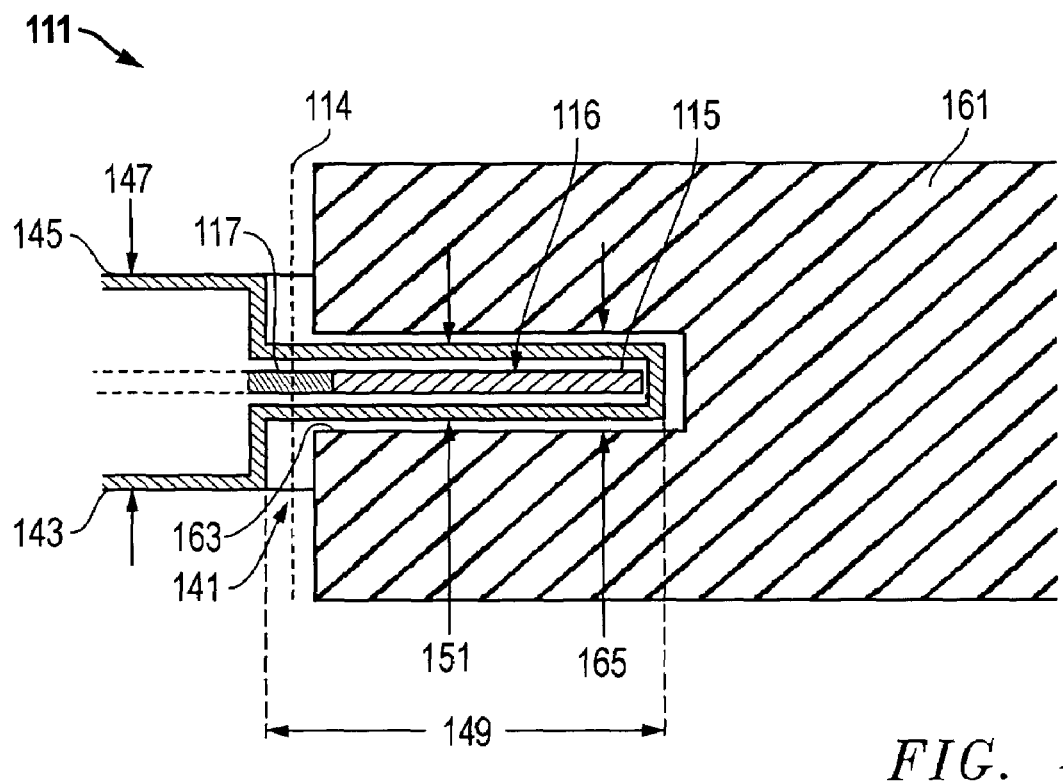
FIG. 4 is a sectional side view of the disk drive of FIG. 2 located in a disk erase apparatus.
Figure 5:
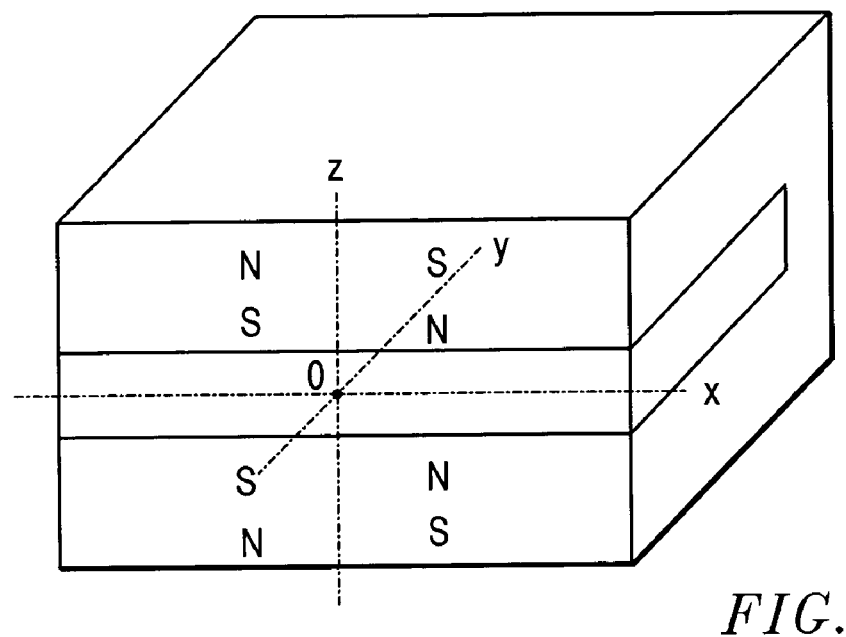
FIG. 5 is an isometric view of a simplified HDD disk erase apparatus.
Figure 6:
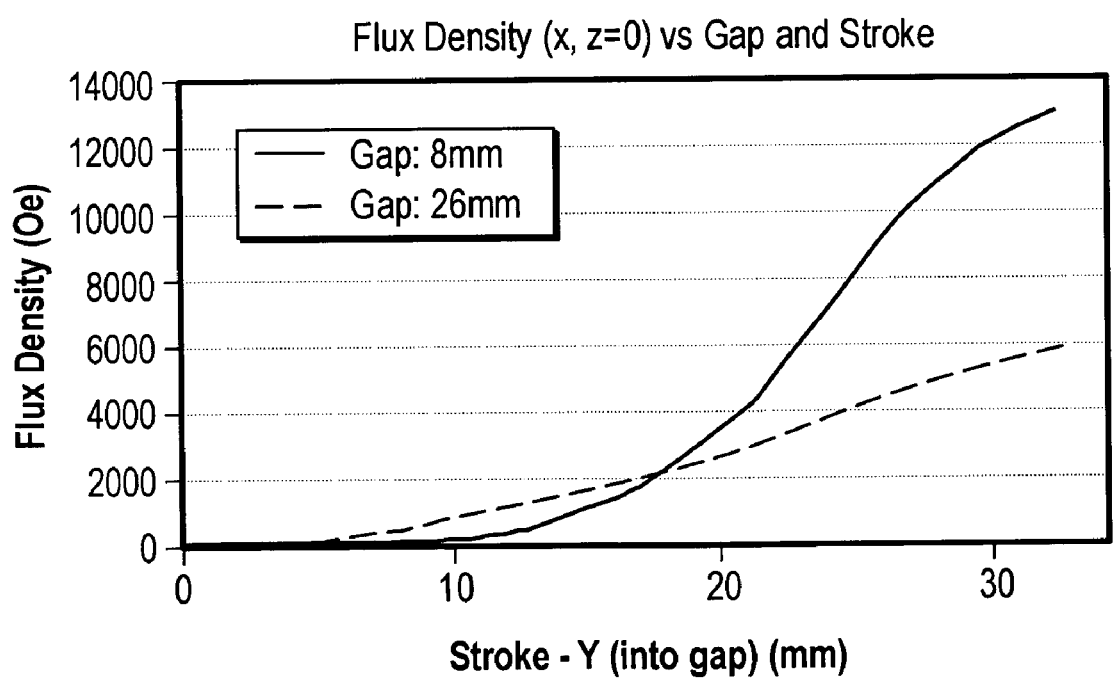
FIG. 6 show plots of magnetic flux density as a function of gap and stroke.

The enclosure 113 of drive 111 comprises a base 143 and a top cover or cover 145. The enclosure 113 has an axial thickness 147, as best seen in FIG. 4. The enclosure 113 also has a "disk region" 141 that, in the embodiment shown, is formed on both the base 143 and the cover 145. However, the disk region 141 may be formed on only one element or only one portion of the enclosure 113. The disk region 149 is formed by an indentation in the enclosure 113, such as a rectangular notch.

The disk region 141 has a length 149 that extends in a radial direction, relative to the axis 114 of the magnetic disk 115. The disk region 141 is located over all, or nearly all, of the usable redial portion of the storage area 116 of the magnetic disk 115. In the embodiment shown, the disk region 141 spans more than the entire radial length 149 of the storage area 116 of the magnetic disk 115, so that the entire storage area 116 may be erased when the magnetic disk 115 is rotated. The disk region 141 has an axial thickness 151 that is less than the axial thickness 147 of the enclosure 113 to allow a minimized working magnetic gap for erasing the magnetic disk 115 while the magnetic disk 115 is located inside the enclosure 113.

In addition, the disk region 141 has a width 153 that is transverse to the radial direction and to the length 149. The width 153 is less than a width 155 of the enclosure 113. The width 153 of disk region 141 includes the widths 153a, 153b of the base 143 and cover 145, respectively. In the embodiment shown, the width 153a of the disk region on the base 143 differs from the width 153b of the disk region 141 on the cover 145. The design and configuration of the working magnetic gap reduces stray magnetic fields to prevent motor rotor demagnetization damage.

The present invention is designed to be used as part of a system for erasing magnetic disks in hard disk drives. The system includes a disk erase apparatus 161 (FIG. 4) having a high strength magnetic field for erasing the magnetic disk 115 while the magnetic disk 115 is located inside the hard disk drive assembly (e.g., the enclosure 113). The hard disk drive 111 is inserted into a magnetic gap 163 of the disk erase apparatus 161. The magnetic gap 163 defines an axial dimension 165 that is greater than the axial thickness 151 of the disk region 141 and less than the axial thickness 147 of the enclosure 113.

In addition, the present invention comprises a method of erasing magnetic disks in hard disk drives. The method comprises providing a disk erase apparatus 161 having a magnetic gap 163 with a high strength magnetic field, and a hard disk drive 111 having an enclosure 113, a magnetic disk 115 inside the enclosure 113, and a disk region 141 formed in the enclosure. The method further comprises configuring the disk region 141 with an axial thickness 151 that is less than an axial thickness 147 of the enclosure 113. In the next step, the hard disk drive 111 is inserted into the disk erase apparatus 161 such that the disk region 141 is located in the magnetic gap 163. Since the magnetic disk 115 is sandwiched between the portions of disk region 141 on the base 143 and cover 145, at least the storage area 116 of the magnetic disk 115 is located in the magnetic gap 163 as well. The method further comprises rotating the magnetic disk 115 and erasing the magnetic disk 115 while the magnetic disk 115 is located inside the hard disk drive assembly 111, and thereafter removing the hard disk drive 111 from the disk erase apparatus 161.

The method further comprises configuring the magnetic gap 163 with an axial dimension 165 that is greater than the axial thickness 151 of the disk region 141 and less than the axial thickness 147 of the enclosure 113. As described previously, the method may comprise providing the enclosure 113 with a base 143 and a cover 145, and forming the disk region 141 on portions of both the base 143 and the cover 145. Preferably, the method comprises erasing an entire storage area 116 of the magnetic disk 115, and reducing stray magnetic fields to prevent motor rotor demagnetization damage.

An alternative embodiment of the present invention is depicted in FIG. 3. In this embodiment, a width 253 of the disk region 241 of the enclosure 213 and disk drive 211 is configured to extend completely across the entire width 255 of the cover 245, and substantially all of the width 255 of the base 243. Other than this difference, the descriptions applied to the previous embodiment are equally applicable.

The present invention has several advantages, including the ability to provide a fast, simple, low cost method of erasing the disk(s) of a disk drive while still at the HDD assembly level. The invention allows the continued use of HDD level disk erase, whereas otherwise it would be abandoned for other more expensive disk erase methods. The present invention minimizes the thickness of the HDD in a localized region over the disks. This allows a narrower working magnetic gap of the HDD level disk erase apparatus that provides two important benefits: (1) increased magnetic field for the same amount of magnet material, and (2) reduced stray fields and increased gradient of magnetic flux density as the HDD is inserted into the gap, which can help prevent motor rotor demagnetization damage. The increase in magnetic flux density is an inverse relationship to magnet gap, so small reductions in magnet gap have significant improvement in magnetic flux density.

The present invention allows a lower cost method of disk erase compared to prior art methods. The present design allows the magnetic gap of the HDD level erase apparatus to be narrower, which achieves a higher magnetic flux density for the same amount of permanent magnet. In addition, it reduces the stray fields and helps to reduce any spindle motor magnet rotor modification.

In addition, the 3.5" standard form factor HDD has an axial thickness (relative to the disks) of one inch that has allowed the packaging of five disks in an HDD. Although some HDD products use this number of disks, the current industry trend is to use fewer or only one disk per HDD. In contrast, only about 15% of the desktop HDDs recently built had only one disk. However, currently about 70% of the desktop HDDs being built have only one disk. This allows a smaller axial dimension envelope of the HDD that contains the disk(s). Such a configuration makes it feasible and economic to minimize at least a portion of the HDD chassis to allow a reduced magnetic gap of an HDD level disk eraser apparatus.

While the invention has been shown or described in only some of its forms, it should be apparent to those skilled in the art that it is not so limited, but is susceptible to various changes without departing from the scope of the invention.

What is claimed is:

1. A hard disk drive, comprising:
    an enclosure having a spindle motor mounted thereto, a perimeter edge, and an axial thickness;
    a magnetic disk mounted to the spindle motor for rotation relative to the enclosure, the magnetic disk having an axis of rotation and a storage area;
    an actuator mounted to the enclosure and having a head for reading information from and/or writing information to the magnetic disk; and
    the enclosure also having a disk region located over at least a portion of the storage area of the magnetic disk, the disk region having an axial thickness that is less than the axial thickness of the enclosure to define a working magnetic gap for erasing the magnetic disk while the magnetic disk is inside the enclosure, and the disk region extends radially from said at least a portion of the storage area to the perimeter edge of the enclosure.

2. The hard disk drive of claim 1, wherein the enclosure has a base and a cover, and the disk region is located on portions of both the base and the cover.

3. The hard disk drive of claim 1, wherein the disk region is formed by an indentation in the enclosure.

4. The hard disk drive of claim 3, wherein the indentation is a rectangular notch.

5. The hard disk drive of claim 1, wherein the disk region has a length extending in a radial direction, relative to the axis of the magnetic disk, that spans an entire radial length of the storage area of the magnetic disk, such that the entire storage area may be erased.

6. The hard disk drive of claim 5, wherein the disk region has a width tat is transverse to the radial direction, and the width is less than a width of the enclosure.

7. The hard disk drive of claim 6, wherein the enclosure comprises a base and a cover, and the width of the disk region on the base differs from the width of the disk region on the cover.

8. The hard disk drive of claim 1, wherein the working magnetic gap reduces stray magnetic fields to prevent motor rotor demagnetization damage, and increases a gradient of magnetic flux density as the hard disk drive is inserted into a disk erase apparatus.

9. A system for erasing a magnetic disk in a hard disk drive, comprising:
    a disk erase apparatus having a high strength magnetic field for erasing a magnetic disk while the magnetic disk is located inside a hard disk drive assembly;
    a hard disk drive having an enclosure and a magnetic disk mounted inside the enclosure for storing information, the magnetic disk having a storage area and defining an axis of rotation and a radial direction relative to the axis;
    the enclosure having an axial thickness and a disk region located over a radial portion of the magnetic disk, the disk region having an axial thickness that is less than the axial thickness of the enclosure, and the disk region providing a working magnetic gap for the disk erase apparatus so that the magnetic disk can be erased inside the hard disk drive assembly; and wherein
    the hard disk drive assembly is inserted into a magnetic gap of the disk erase apparatus, and the magnetic gap defines an axial dimension that is greater than the axial thickness of the disk region and less than the axial thickness of the enclosure.

10. The system of claim 9, wherein the enclosure includes a base and a cover, and the disk region is located on portions of both the base and the cover.

11. The system of claim 9, wherein the disk region is formed by an indentation in the enclosure.

12. The system of claim 11, wherein the indentation is a rectangular notch.

13. The system of claim 9, wherein the disk region has a length extending in the radial direction that spans an entire radial length of the storage area of the magnetic disk, such that the entire storage area may be erased.

14. The system of claim 13, wherein the disk region has a width that is transverse to the radial direction, and the width is less than a width of the enclosure.

15. The system of claim 14, wherein the enclosure comprises a base and a cover, and the width of the disk region on the base differs from the width of the disk region on the cover.

16. The system of claim 9, wherein the working magnetic gap reduces stay magnetic fields to prevent motor rotor demagnetization damage, and increases a gradient of magnetic flux density as the hard disk drive is inserted into the disk erase apparatus.

17. A system for erasing a magnetic disk in a hard disk drive, comprising:
    a disk erase apparatus having a high strength magnetic field for erasing a magnetic disk while the magnetic disk is located inside a hard disk drive assembly;

a hard disk drive having an enclosure with a perimeter edge, and a magnetic disk mounted inside the enclosure for storing information, the magnetic disk having a storage area and defining an axis of rotation and a radial direction relative to the axis;

the enclosure having an axial thickness and a disk region located over a radial portion of the magnetic disk, the disk region having an axial thickness that is less than the axial thickness of the enclosure, and the disk region extends radially from the radial portion of the magnetic disk to the perimeter edge of the enclosure, and the disk region providing a working magnetic gap for the disk erase apparatus so that the magnetic disk can be erased inside the hard disk drive assembly; wherein the hard disk drive assembly is inserted into a magnetic gap of the disk erase apparatus, and the magnetic gap defines an axial dimension that is greater than the axial thickness of the disk region and less than the axial thickness of the enclosure; and wherein the working magnetic gap reduces stray magnetic fields to prevent motor rotor demagnetization damage, and increases a gradient of magnetic flux density as the hard disk drive is inserted into the disk erase apparatus.

18. A system according to claim 17, wherein the enclosure includes a base and a cover, and the disk region is located on portions of both the base and the cover, and the disk region comprises a rectangular notch indentation in both the base and the cover.

19. A system according to claim 17, wherein the disk region has a length extending in the radial direction that spans an entire radial length of the storage area of the magnetic disk, such that the entire storage area may be erased, the disk region has a width that is transverse to the radial direction, the disk region width is less than a width of the enclosure, the enclosure comprises a base and a cover, and the width of the disk region on the base differs from the width of the disk region on the cover.

* * * * *

UNITED STATES PATENT AND TRADEMARK OFFICE
CERTIFICATE OF CORRECTION

| | | |
|---|---|---|
| PATENT NO. | : 7,050,255 B2 | Page 1 of 1 |
| APPLICATION NO. | : 10/673600 | |
| DATED | : May 23, 2006 | |
| INVENTOR(S) | : Kirk Price et al. | |

It is certified that error appears in the above-identified patent and that said Letters Patent is hereby corrected as shown below:

In Column 8, Line 7, please replace the word "tat" with "that".

Signed and Sealed this

Twenty-second Day of August, 2006

JON W. DUDAS
*Director of the United States Patent and Trademark Office*